US012518666B2

(12) United States Patent
Ye et al.

(10) Patent No.: US 12,518,666 B2
(45) Date of Patent: Jan. 6, 2026

(54) DISPLAY PANEL AND DETECTION METHOD THEREOF, AND DISPLAY DEVICE

(71) Applicant: HKC CORPORATION LIMITED, Shenzhen (CN)

(72) Inventors: Zhiwei Ye, Shenzhen (CN); Chen Chen, Shenzhen (CN); Xiufeng Zhou, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/959,594

(22) Filed: Nov. 25, 2024

(65) Prior Publication Data

US 2025/0174164 A1 May 29, 2025

(30) Foreign Application Priority Data

Nov. 28, 2023 (CN) ........................ 202311607924.3

(51) Int. Cl.
*G09G 3/00* (2006.01)
*G09G 3/3258* (2016.01)

(52) U.S. Cl.
CPC ........... *G09G 3/006* (2013.01); *G09G 3/3258* (2013.01); *G09G 2300/0819* (2013.01); *G09G 2300/0842* (2013.01); *G09G 2330/02* (2013.01); *G09G 2330/12* (2013.01)

(58) Field of Classification Search
CPC ................ G09G 3/006; G09G 3/3258; G09G 2300/0819; G09G 2300/0842; G09G 2330/02; G09G 2330/12; G09G 3/035; G09G 2380/02; G09F 9/301
See application file for complete search history.

(56) References Cited

U.S. PATENT DOCUMENTS

| | | | | |
|---|---|---|---|---|
| 6,265,889 B1 * | 7/2001 | Tomita | G09G 3/006 324/760.02 |
| 2011/0090202 A1 * | 4/2011 | Han | G09G 3/3233 345/76 |

(Continued)

FOREIGN PATENT DOCUMENTS

| | | |
|---|---|---|
| CN | 110853559 A | 2/2020 |
| CN | 111487822 A | 8/2020 |

(Continued)

*Primary Examiner* — Antonio Xavier

(57) ABSTRACT

A display panel and a detection method thereof, and a display device are disclosed. The display panel includes a pixel drive circuit, a data drive circuit, a detection circuit, and a power supply circuit. The data drive circuit includes a data driver and multiple data out-put pins that are respectively connected to multiple data lines through bonding. The detection circuit includes a detector and multiple detection ends that are respectively connected to the multiple data output pins and that are each used to receive a signal transmitted from the respective data line to the respective data output pins. After the display panel enters a test mode, a preset timing is provided to drive each control line to be turned on so that each pixel drive subcircuit operates and the detection circuit obtains a detection signal from each data line.

18 Claims, 4 Drawing Sheets

(56) References Cited

U.S. PATENT DOCUMENTS

| | | | | |
|---|---|---|---|---|
| 2016/0189581 | A1* | 6/2016 | Hwang | G09G 3/006 345/691 |
| 2019/0235950 | A1* | 8/2019 | Kurihara | G09G 5/003 |
| 2020/0027379 | A1* | 1/2020 | Kim | G01R 1/30 |
| 2021/0407349 | A1 | 12/2021 | Choi | |
| 2023/0093830 | A1* | 3/2023 | Zhang | H10K 59/131 345/690 |
| 2023/0116660 | A1 | 4/2023 | Kim et al. | |

FOREIGN PATENT DOCUMENTS

| | | | |
|---|---|---|---|
| CN | 112086056 | A | 12/2020 |
| CN | 114706239 | A | 7/2022 |

* cited by examiner

DISPLAY PANEL AND DETECTION METHOD THEREOF, AND DISPLAY DEVICE

CROSS-REFERENCE TO RELATED APPLICATIONS

This application claims the priority and benefit of Chinese patent application number 2023116079243, titled "Display Panel and Detection Method Thereof, and Display Device" and filed Nov. 28, 2023 with China National Intellectual Property Administration, the entire contents of which are incorporated herein by reference.

TECHNICAL FIELD

This application relates to the field of display technology, and more particularly relates to a display panel and a detection method thereof, and a display device.

BACKGROUND

The description provided in this section is intended for the mere purpose of providing background information related to the present application but doesn't necessarily constitute prior art.

OLED (Organic Light-Emitting Diode) displays have many advantages such as thin body, power saving, bright colors, and high image quality, and have been widely used. For example, OLED TVs, mobile phones, and laptops are gradually becoming dominant in the field of flat panel displays. In OLED display panel, pixels are arranged in a matrix including multiple rows and columns. In the earliest pixel design, each pixel may be composed of two transistors (T) and a capacitor (C), which is also called 2T1C pixel subcircuit. One 2T1C drive subcircuit may be disposed correspond to a light-emitting element (LED), so one pixel drive subcircuit is matched with one LED to form a sub-pixel.

Whether it is a liquid crystal display panel or an organic light-emitting display panel, the external drive circuit needs to be connected to the display panel through a bonding method, such as through a flexible circuit board. The reliability of the bonding connection between the display panel and the flexible electrode circuit directly affects the performance of the display panel. Therefore, those having ordinary skill in the art are in urgent need of a solution that can quickly detect the bonding state of the display panel.

SUMMARY

It is therefore one purpose of the present application to provide a display panel and a detection method thereof and further a display device, so that by using a pixel drive circuit to detect the bonding pins of the display panel, the display panel bonding state can be quickly detected to improve the quality of the display panel.

The present application discloses a display panel. The display panel includes a pixel drive circuit, a data drive circuit, a detection circuit, and a power supply circuit. The pixel drive circuit includes multiple control lines, multiple data lines, multiple pixel drive subcircuits, and multiple light-emitting elements. Each pixel drive subcircuit is used to drive the multiple light-emitting elements to emit light. The pixel drive subcircuit is connected to at least one control line and one data line. The power supply circuit provides a preset voltage signal for the pixel drive subcircuit. The data drive circuit includes a data driver and multiple data output pins. The multiple data output pins are connected to the multiple data lines by bonding. The detection circuit includes a detector and multiple detection ends. The multiple detection ends are respectively connected to the multiple data output pins, and are used to receive the signal transmitted from the data line to the data output pin. After the display panel enters the test mode, a preset timing is provided to drive the control line to be turned on. The pixel drive subcircuit operates, and the detection circuit obtains the detection signal from the data line.

In some embodiments, multiple first switches are arranged between the data driver and the multiple data output pins. Multiple second switches are arranged between the detector and the multiple detection ends. When the display panel is in display mode, the first switches are turned on and the second switches are turned off. When the display panel is in detection mode, the second switches are turned on and the first switches are turned off.

In some embodiments, the pixel drive subcircuit includes a drive control circuit, a storage circuit, a data input circuit, a power supply voltage input terminal, a preset voltage input terminal, and a control signal input terminal. One end of the storage circuit is connected to the power supply voltage input terminal, and the other end of the storage circuit is connected to the first node. The storage circuit is used to store a voltage of the first node. One end of the data input circuit is connected to the second node, and the other end is connected to the data line. The data input circuit is used to receive the data signal of the data line and transmit it to the second node. The drive control circuit is connected to the first node, the second node, the power supply voltage input terminal, the control signal input terminal, the preset voltage input terminal, and the light-emitting element. The power supply circuit provides a power supply voltage signal for the power supply voltage input terminal. The power supply voltage provides a preset voltage signal to the preset voltage input terminal. The control line provides a control signal to the control signal input terminal. After the display panel enters the test mode, the control line is turned on according to a preset timing. After the preset voltage signal charges the first node, the drive control circuit outputs the voltage of the second node from the data input circuit to the data line, which is received by the detection circuit.

In some embodiments, the drive control circuit includes a first active switch, a second active switch, a third active switch, a fourth active switch, and a fifth active switch. One end of the first active switch is connected to the power supply voltage input terminal, and the other end of the first active switch is connected to the second node. One end of the second active switch is connected to the second node, the other end of the second active switch is connected to the third node, and the control end of the second active switch is connected to the first node. One end of the third active switch is connected to the first node, and the other end of the third active switch is connected to the third node. One end of the fourth active switch is connected to the preset voltage input terminal, and the other end of the fourth active switch is connected to the first node. One end of the fifth active switch is connected to the third node, and the other end of the fifth active switch is connected to the fourth node. The fourth node is connected to the light-emitting element. The data input circuit includes a sixth active switch. One end of the sixth active switch is connected to the data line, and the other end of the sixth active switch is connected to the second node.

In some embodiments, the preset timing includes a test input phase and a test receiving phase. In the test input phase, the first active switch, the fourth active switch, and the fifth active switch are turned on, while the third active switch and the sixth active switch are turned off. The preset voltage charges the first node. In the test receiving phase, the second active switch, the third active switch, and the sixth active switch are turned on, while the first active switch, the fourth active switch, and the fifth active switch are turned off. The voltage of the first node is output to the data line through the second node and received by the detection circuit. The detection signal is the preset voltage signal.

In some embodiments, the drive control circuit further includes a seventh active switch. One end of the seventh active switch is connected to the fourth node, and the other end of the seventh active switch is connected to a preset voltage input terminal. The preset timing includes a test input phase and a test receiving phase. In the test input phase, the first active switch, the fourth active switch, the fifth active switch, and the seventh active switch are turned on, while the third active switch and the sixth active switch are turned off. The preset voltage charges the first node and the third node. In the test receiving phase, the first active switch, the second active switch, the third active switch, the fifth active switch, and the sixth active switch are turned on, while the fourth active switch and the seventh active switch are turned off. The power supply voltage input terminal provides a voltage for the second node and outputs it to the data line, which is received by the detection circuit. The detection signal is the power supply voltage signal.

In some embodiments, the control signal input terminals include a first control signal terminal, a second control signal terminal, and a third control signal terminal. The control terminal of the first active switch and the control terminal of the fifth active switch are each connected to the third control signal terminal. The control terminal of the fourth active switch is connected to the first control signal terminal. The control terminal of the third active switch and the control terminal of the sixth active switch are each connected to the second control signal terminal.

The present application discloses a detection method of a display panel, wherein the display panel includes the above-mentioned display panel, and the detection method includes the following operations:

- entering a detection mode;
- providing a preset timing for the display panel to drive the multiple pixel drive subcircuits to operate;
- obtaining a detection signal from a data line;
- comparing the detection signal with a preset standard voltage signal, if it meets the preset standard voltage signal range, determining that the display panel is qualified.

In some embodiments, the pixel drive subcircuit includes a drive control circuit, a storage circuit, a data input circuit, a power supply voltage input terminal, a preset voltage input terminal, and a control signal input terminal. The preset timing includes a test input phase and a test receiving phase. In the test input phase, the preset voltage input terminal charges the storage circuit. In the test receiving phase, the storage circuit charges the first node. The voltage of the first node is output to the data line through the second node and received by the detection circuit. The detection signal is the preset voltage signal.

The present application further discloses a display device, including the above-mentioned display panel.

In this application, a detector is connected between the data driver and the data output pin. When the display panel is in detection mode, a preset timing is used to drive multiple pixel drive subcircuits to operate. Then the detector receives the signal transmitted on the data line to determine the connection state between the data line and the data output pin. When the signal transmitted on the data line is inconsistent with the preset signal, it means that there is a problem with the bonding between the corresponding data line and the data output pin. In this solution, the function of the pixel drive circuit is mainly utilized. The pixel drive circuit is used to output a signal to the data line in the reverse direction to detect whether the data line is connected to the data output pin, so as to quickly detect the bonding of the display panel. When some data output pins have poor bonding, the detector is used to accurately locate the position of the data output pin to repair the display panel. On the one hand, it can improve the production yield of the display panel, which is conducive to improving the quality of the display panel. On the other hand, it can reduce the difficulty of repairing the display panel and reduce the cost.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principles of the present application in conjunction with the text description. Apparently, the drawings in the following description merely represent some embodiments of the present disclosure, and for those having ordinary skill in the art, other drawings may also be obtained based on these drawings without investing creative. In the drawings.

Figure 1:
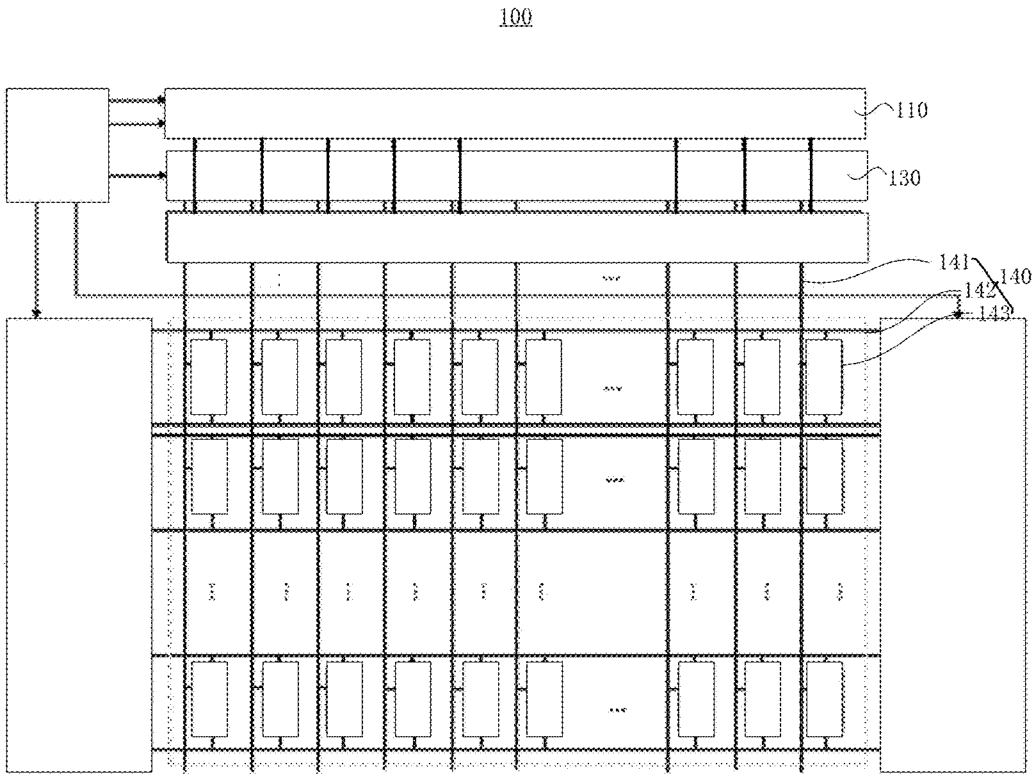
FIG. 1 is a schematic diagram of a display panel according to the present application.

In the drawings: 10, display device; 100, display panel; 110, data drive circuit; 111, data driver; 112, data output pin; 113, first switch; 130, detection circuit; 131, detector; 132, detection end; 133, second switch; 140, pixel drive circuit; 141, data line; 142, control line; 143, pixel drive subcircuit; 144, light-emitting element; 150, drive control circuit; 151, storage circuit; 152, data input circuit; VDD, power supply voltage input terminal; VIN, preset voltage input terminal; S1, first control signal terminal; S2, second control signal terminal; S3, third control signal terminal; C, capacitor; T1, first active switch; T2, second active switch; T3, third active switch; T4, fourth active switch; T5, fifth active switch; T6, sixth active switch; T7, seventh active switch; N1, first node; N2, second node; N3, third node; N4, fourth node.

DETAILED DESCRIPTION OF EMBODIMENTS

It should be understood that the terms used herein, the specific structures and functional details disclosed therein are merely representative for describing some specific embodiments, but the present application can be implemented in many alternative forms and should not be construed as being limited to only these embodiments described herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. In addition, terms "up", "down", "left", "right", "vertical", and "horizontal", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure. For those of ordinary skill in the art, the specific meanings of the above terms as used in the present application can be understood depending on specific contexts.

The present application will be described in detail below with reference to the accompanying drawings and some optional embodiments.

Figure 2:
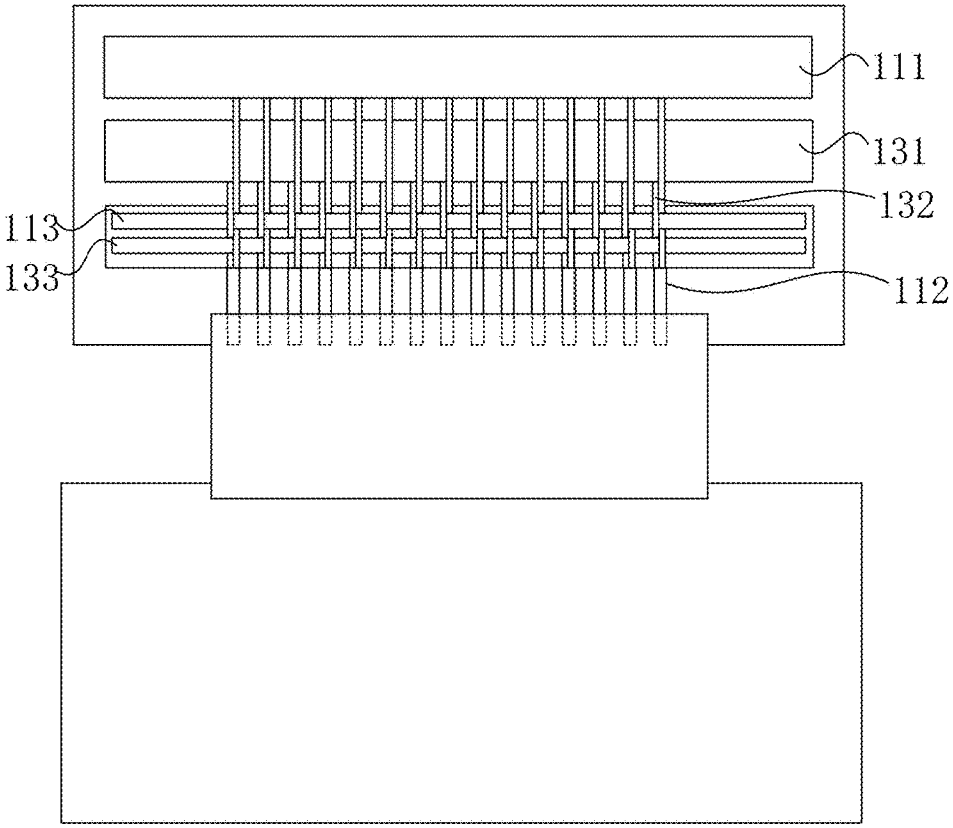
FIG. 2 is a schematic diagram of a data drive circuit and a detection circuit according to the present application.

FIG. 1 is a schematic diagram of a display panel according to the present application. FIG. 2 is a schematic diagram of a data drive circuit and a detection circuit according to the present application. As shown in FIGS. 1-2, the present application discloses a display panel 100. The display panel 100 includes a pixel drive circuit 140, a data drive circuit 110, a detection circuit 130, and a power supply circuit. The pixel drive circuit 140 includes a plurality of control lines 142, a plurality of data lines 141, a plurality of pixel drive subcircuits 143, and a plurality of light-emitting elements 144. Each of the pixel drive subcircuits 143 is used to drive a respective one of the plurality of the light-emitting elements 144 to emit light. The pixel drive subcircuit 143 is connected to at least one of the control lines 142 and one of the data lines 141. The power supply circuit provides a preset voltage signal for the pixel drive subcircuit 143. The data drive circuit 110 includes a data driver 111 and multiple data output pins 112. The multiple data output pins 112 are connected to the plurality of data lines 141 by bonding.

The detection circuit 130 includes a detector 131 and a plurality of detection ends 132. The plurality of detection ends 132 are respectively connected to the plurality of data output pins 112, and are used to receive the signals transmitted from the data lines 141 to the data output pins 112. After the display panel 100 enters a test mode, a preset timing is provided to drive the control line 142 to turn on, the pixel drive subcircuit 143 operates, and the detection circuit 130 obtains a respective detection signal from the data line 141.

In this application, a detector 131 is connected between the data driver 111 and the data output pins 112. In the detection mode of the display panel 100, a preset timing is used to drive multiple pixel drive subcircuits 143 to operate. The connection state between the data line 141 and the data output pin 112 is determined by receiving a signal transmitted on the data line 141 through the detector 131. When the signal transmitted on the data line 141 is inconsistent with the preset signal, it means that there is a problem with the bonding between the corresponding data line 141 and the data output pin 112. In this solution, the function of the pixel drive circuit 140 is mainly utilized. The pixel drive circuit 140 is used to output a signal to the data line 141 in the reverse direction to detect whether the data line 141 is connected to the data output pin 112, so as to quickly detect the bonding of the display panel 100. When some data output pins 112 have poor bonding, the detector 131 is used to accurately locate the position of the data output pin 112 to repair the display panel 100. On the one hand, it can improve the production yield of the display panel 100, which is conducive to improving the quality of the display panel 100. On the other hand, it can reduce the difficulty of repairing the display panel 100 and reduce the cost.

It is understandable that before the display panel 100 is bonded, the large board can also be tested to detect whether the circuits of each display panel 100 on the large board are faulty. After bonding, it can be determined that the internal circuits of the display panel 100 are fault-free, and then it can be determined that the problem is poor bonding. It is worth mentioning that the internal circuits of the display panel 100 may also fail, and it is not possible to completely determine that the internal circuits of the display panel 100 are fault-free through large-board detection. However, relatively speaking, the present application can quickly detect the bonding failure of the display panel 100 and other possible failures of the display panel 100.

Data driver 111, detector 131, etc. are all arranged outside display panel 100, while pixel drive circuit 140 is arranged inside display panel 100. Data driver 111 and detector 131 are connected to data line 141 through data output pin 112 by bonding.

The data line 141 of the display panel 100 may be connected to the bonding area through a fan-out wiring in the non-display area, and the bonding area may include a plurality of bonding pins. Correspondingly, the data output pins 112 are connected to the bonding pins one by one to achieve conduction. In the related technology, the data driver 111 may be used to drive the display panel 100 to display, and the brightness of the display panel 100 is detected to detect whether the bonding is good. However, the above method takes a long time, and the brightness of the display panel 100 may need to be judged manually, and there are other factors that affect it, resulting in high difficulty in judgment and increased costs. In the present application, the bonding yield of multiple data output pins 112 can be detected by setting the test mode and giving a preset timing, which is convenient and fast.

Continuing to refer to FIG. 2, a plurality of first switches 113 are arranged between the data driver 111 and the plurality of data output pins 112. A plurality of second switches 133 are arranged between the detector 131 and the plurality of detection ends 132. When the display panel 100 is in display mode, the first switches 113 are turned on and the second switches 133 are turned off. When the display panel 100 is in detection mode, the second switches 133 are turned on and the first switches 113 are turned off.

It is understandable that the first switch 113 is set on the branch of the data driver 111 and the data output pin 112, the second switch 133 is set on the branch of the detector 131 and the data output pin 112, and the first switch 113 and the second switch 133 are not turned on at the same time. A pair of differential signals can be used for control during the test process. In display mode, data driver 111 provides data signal to the data line 141. In test mode, data line 141 provides a detection signal to detector 131.

In one embodiment, the detector 131 is integrated with the data driver 111. The display panel 100 may further include a controller, which controls the data driver 111 and the detector 131. The controller may be a timing controller, which provides a control signal for the control line 142. A line-by-line progressive scanning method may be used to provide a control signal for the control line 142. The main function of the timing controller is to receive a data source signal, control the data driver 111 after processing, and thus drive the OLED screen to display an image.

Figure 3:
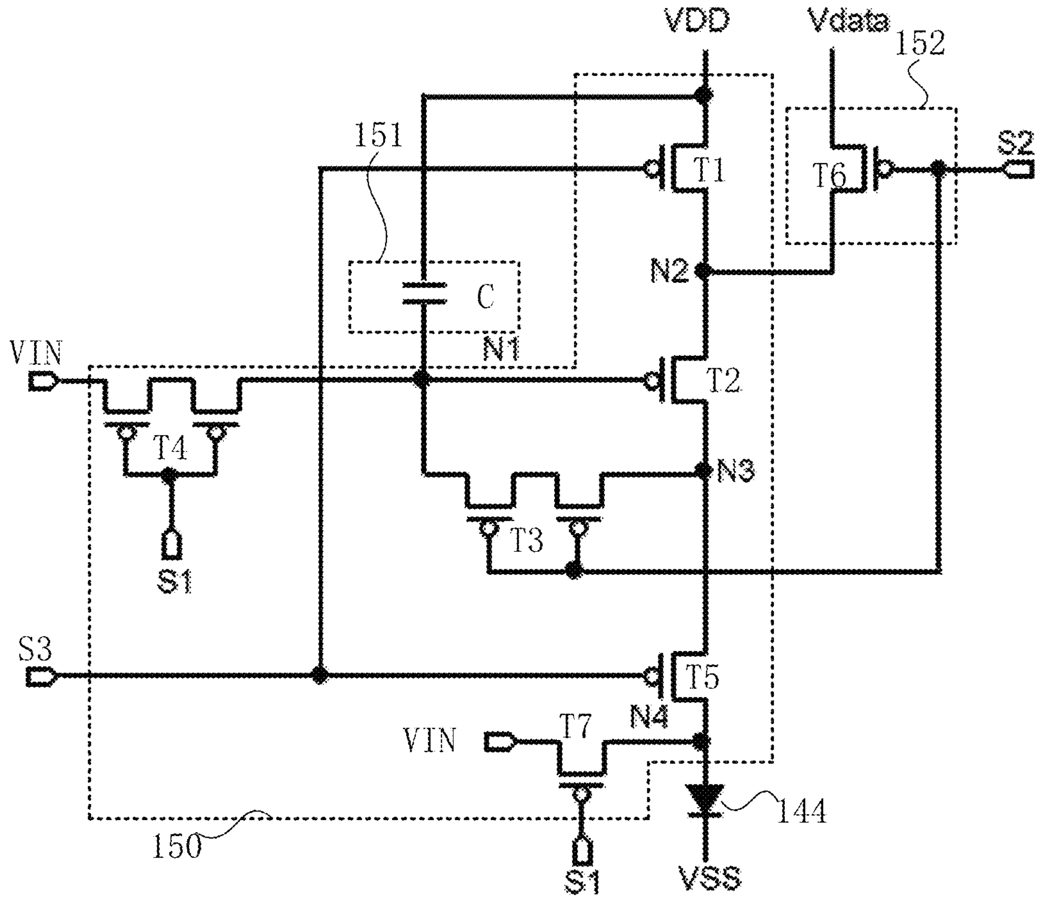
FIG. 3 is a schematic diagram of a first pixel drive circuit according to the present application.

FIG. 3 is a schematic diagram of a first pixel drive circuit according to the present application. As shown in FIG. 3, the display panel 100 includes a plurality of pixel drive subcircuits 143. The pixel drive subcircuit 143 includes a drive control circuit 150, a storage circuit 151, a data input circuit 152, a power supply voltage input terminal VDD, a preset voltage input terminal VIN, and a scan signal input terminal.

One end of the storage circuit 151 is connected to the power supply voltage input terminal VDD. The other end of the storage circuit 151 is connected to the first node N1. The storage circuit 151 is used to store a voltage of the first node N1.

One end of the data input circuit 152 is connected to the second node N2, and the other end is connected to the data line 141. The data input circuit 152 is used to receive a data signal of the data line 141 and transmit it to the second node N2. The drive control circuit 150 is connected to the first node N1, the second node N2, the power supply voltage input terminal VDD, the scan signal input terminal, the preset voltage input terminal VIN, and the light-emitting element 144. The power supply circuit provides a power supply voltage signal for the power supply voltage input terminal VDD. The power supply voltage provides a preset voltage signal for the preset voltage input terminal VIN.

After the display panel 100 enters the test mode, the control line 142 is turned on according to the preset timing. After the preset voltage signal charges the first node N1, the drive control circuit 150 outputs the voltage of the second node N2 from the data input circuit 152 to the data line 141, which is received by the detection circuit 130.

In this solution, the storage function of storage circuit 151 is mainly used to store the voltage of first node N1. In the second stage, the voltage of first node N1 is transmitted to second node N2 by drive control circuit 150. Using the control of data input circuit 152, the voltage of second node N2 is reversely output from data line 141 to detector 131, and detector 131 receives the detection signal and compares it with the preset voltage of first node N1. If it is within the comparison range, it means that the bonding state of display panel 100 is good. If it is not within the comparison range, it means that the bonding of display panel 100 is poor, and the corresponding data line 141 and data drive pin can be accurately located.

Specifically, the drive control circuit 150 includes a first active switch T1, a second active switch T2, a third active switch T3, a fourth active switch T4, and a fifth active switch T5. One end of the first active switch T1 is connected to the power supply voltage input terminal VDD, and the other end of the first active switch T1 is connected to the second node N2. One end of the second active switch T2 is connected to the second node N2, and the other end of the second active switch T2 is connected to the third node N3, and a control end of the second active switch T2 is connected to the first node N1. One end of the third active switch T3 is connected to the first node N1, and the other end of the third active switch T3 is connected to the third node N3. One end of the fourth active switch T4 is connected to the preset voltage input terminal VIN, and the other end of the fourth active switch T4 is connected to the first node N1. One end of the fifth active switch T5 is connected to the third node N3, and the other end of the fifth active switch T5 is connected to the fourth node N4. The fourth node N4 is connected to the light-emitting element 144. The drive control circuit 150 further includes a seventh active switch T7. One end of the seventh active switch T7 is connected to the fourth node N4, and the other end of the seventh active switch T7 is connected to the preset voltage input terminal VIN. The data input circuit 152 includes a sixth active switch T6. One end of the sixth active switch T6 is connected to the respective data line 141, and the other end of the sixth active switch T6 is connected to the second node N2. The storage circuit 151 includes a capacitor C, one end of which is connected to the first node N1, and the other end of which is connected to the power supply voltage input terminal VDD.

Figure 4:
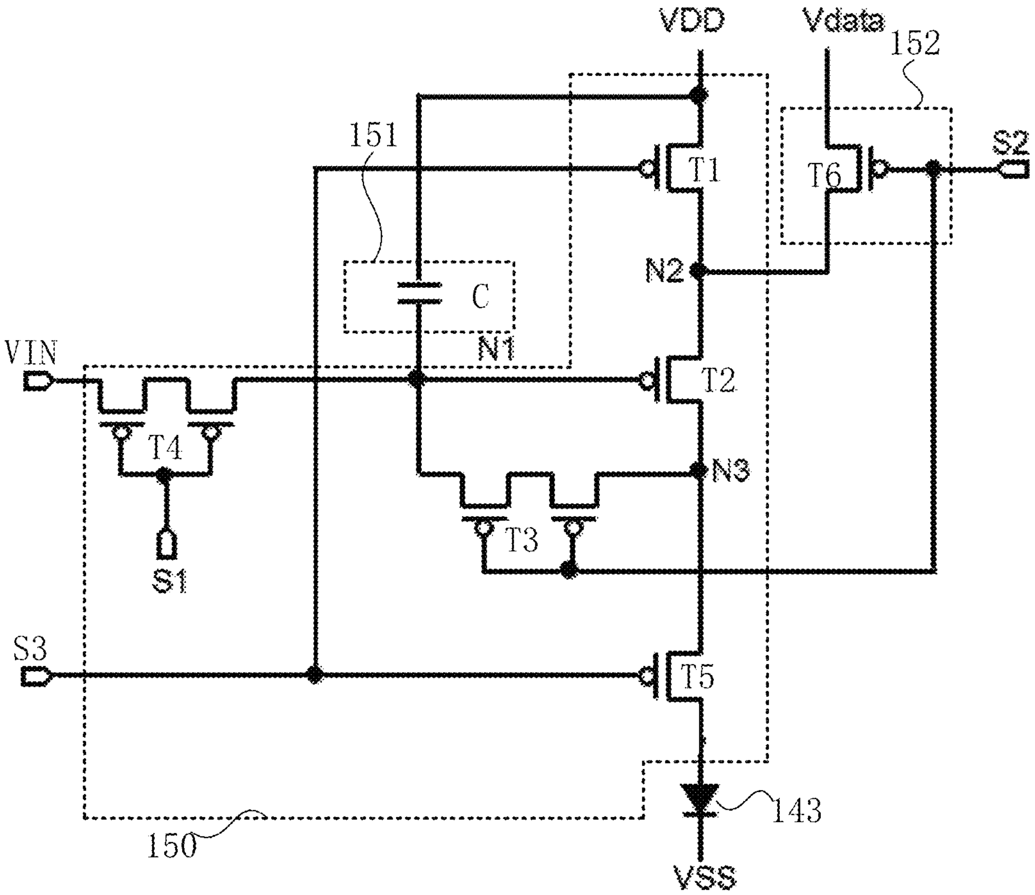
FIG. 4 is a schematic diagram of a second pixel drive circuit according to the present application.

In this solution, a 7T1C pixel drive architecture is specifically adopted, and the solution of this application can actually be applied to a variety of pixel drive architectures, such as 5T2C, 6T1C, 8T1C and other pixel drive architectures. FIG. 4 is a schematic diagram of a second pixel drive circuit according to the present application. As shown in FIG. 4, the pixel drive circuit is a 6T1C pixel drive circuit. In the 7T1C pixel circuit, the seventh active switch can be removed. In this application, only the 7T1C pixel drive architecture is used as an example for explanation.

The pixel drive subcircuit 143 has a reset phase, a data input phase, and a light-emitting phase in a normal display mode. In the reset phase, the fourth active switch T4 and the fifth active switch T5 are turned on. The preset voltage resets the capacitor C. The ground voltage at the cathode end of the light-emitting element 144 resets the third node N3 and the fourth node N4. In the data input phase, the second active switch T2, the third active switch T3, and the sixth active switch T6 are turned on. The data driver 111 provides a data signal to the data line 141, which is then transmitted to the second node N2 by the sixth active switch T6. The capacitor C is charged by the second active switch T2 and the third active switch T3, so that the potential of the first node N1 is increased from the preset voltage to the data voltage. In the light-emitting stage, the first active switch T1, the second active switch T2, and the fifth active switch T5 are turned on, and the light-emitting element 144 emits light.

The preset timing mentioned above is that the test mode has a test input phase and a test receiving phase. In the test input phase, the first active switch T1, the fourth active switch T4, and the fifth active switch T5 are turned on. The third active switch T3 and the sixth active switch T6 are turned off. The preset voltage charges the first node N1. In the test receiving phase, the second active switch T2, the third active switch T3, and the sixth active switch T6 are turned on. The first active switch T1, the fourth active switch T4, and the fifth active switch T5 are turned off. The voltage of the first node N1 is output to the data line 141 through the second node N2 and received by the detection circuit 130. The detection signal is the preset voltage signal.

In this solution, the preset voltage input by the preset voltage input terminal VIN is used. That is, the preset voltage is input through the preset voltage input terminal VIN, and then transmitted to the data line 141 by the drive control circuit 150 and the data input circuit 152, and then received by the detector 131 through the data line 141 and the data output pin 112. Thus, the detection of bonding is realized, and the pixel drive subcircuit 143 can also be tested. That is, in the test input stage, the preset voltage input terminal VIN charges the storage circuit 151. In the test receiving stage, the storage circuit 151 charges the first node N1, and the voltage of the first node N1 is output to the data line 141 through the second node N2 and received by the detection circuit 130, where the detection signal is the preset voltage signal.

It is understandable that if only the bonding between the data line 141 and the data output pin 112 is detected, it can be achieved by driving one row of sub-pixels in the multiple rows of sub-pixels in the display panel 100. For example, when multiple display panels 100 are detected continuously, only one row in each display panel 100 needs to be detected. However, relatively speaking, the time from the first row to the last row to be fully turned on is also very short. Therefore, multiple rows of sub-pixels can be detected by line-by-line progressive scanning to compare whether the preset voltage of each row of sub-pixels is the same, so as to determine whether the line resistance of the display panel 100 is uniform. It can also calculate the line resistance difference between the sub-pixel comparatively closer to data driver 111 and the sub-pixel comparatively farther away from data driver 111. The line resistance difference is mainly caused by the data line 141 routing design. The problem of inconsistent resistance between the far end and the near end caused by the data line 141 routing arrangement can be subsequently compensated by external compensation.

It is worth mentioning that, since each sub-pixel is input with the same preset voltage, when the detector 131 receives the detection signal on each data line 141, multiple detection signals can be compared, and it can also be determined whether the impedance or load on each data line 141 is uniform. Furthermore, the detector 131 can output the detection signal on the data line 141 corresponding to each row to the external analysis module to form a detection table corresponding to each sub-pixel, and compensate the sub-pixels according to the detection table.

In addition, since the second active switch T2 is the driver transistor of the pixel drive subcircuit 143, and the threshold voltage of the driver transistor corresponding to each sub-pixel may be different, different compensation values may be required for different sub-pixels. For the display panel 100, a corresponding sensing circuit is also required to detect the aging of the threshold of the driver tube. In this application, while using the pixel drive subcircuit 143 to detect bonding, the threshold of second active switch T2 is judged, mainly in the detection table mentioned above, the consistency of the detection signal of each sub-pixel is judged, and so the threshold change of each sub-pixel can be obtained, thereby achieving targeted compensation.

In another embodiment, the preset timing includes a test input phase and a test receiving phase. In the test input phase, the first active switch T1, the fourth active switch T4, the fifth active switch T5, and the seventh active switch T7 are turned on, the third active switch T3 and the sixth active switch T6 are turned off, and the preset voltage charges the first node N1 and the third node N3. In the test receiving phase, the first active switch T1, the second active switch T2, the third active switch T3, the fifth active switch T5, and the sixth active switch T6 are turned on, the fourth active switch T4 and the seventh active switch T7 are turned off, the power supply voltage input terminal VDD provides a voltage for the second node N2, and outputs it to the data line 141, which is received by the detection circuit 130, and the detection signal is the power supply voltage signal.

This solution utilizes the power supply voltage signal, which is transmitted to the second node N2 through the power supply voltage signal and then output to the data line 141 by the data input circuit 152. This solution is different from the previous embodiment in that the detection signal in this application does not pass through the second active switch T2, which can avoid the influence of the different threshold voltages of the second active switch T2. This solution can be used in combination with the above solution. That is, the preset timing of this solution can be used in the first detection, and the preset timing solution in the above embodiment can be used in the second detection. The combined use of the two makes the subsequent compensation data more accurate.

Specifically, the control signal input terminal includes a first control signal terminal S1, a second control signal terminal S2, and a third control signal terminal S3. The control terminal of the first active switch T1 and the control terminal of the fifth active switch T5 are each connected to the third control signal terminal S3. The control terminal of the fourth active switch T4 is connected to the first control signal terminal S1. The control terminal of the third active switch T3 and the control terminal of the sixth active switch T6 are each connected to the second control signal terminal S2. The first active switch T1, the second active switch T2, the third active switch T3T3, the fourth active switch T4, the fifth active switch T5, the sixth active switch T6, and the seventh active switch T7 are each a P-type low-temperature polysilicon thin film transistor, a P-type oxide thin film transistor, or a P-type amorphous silicon thin film transistor. In this embodiment, only the P-type thin film transistor is used as an example for explanation, and the same is applicable to the N-type thin film transistor.

Figure 5:
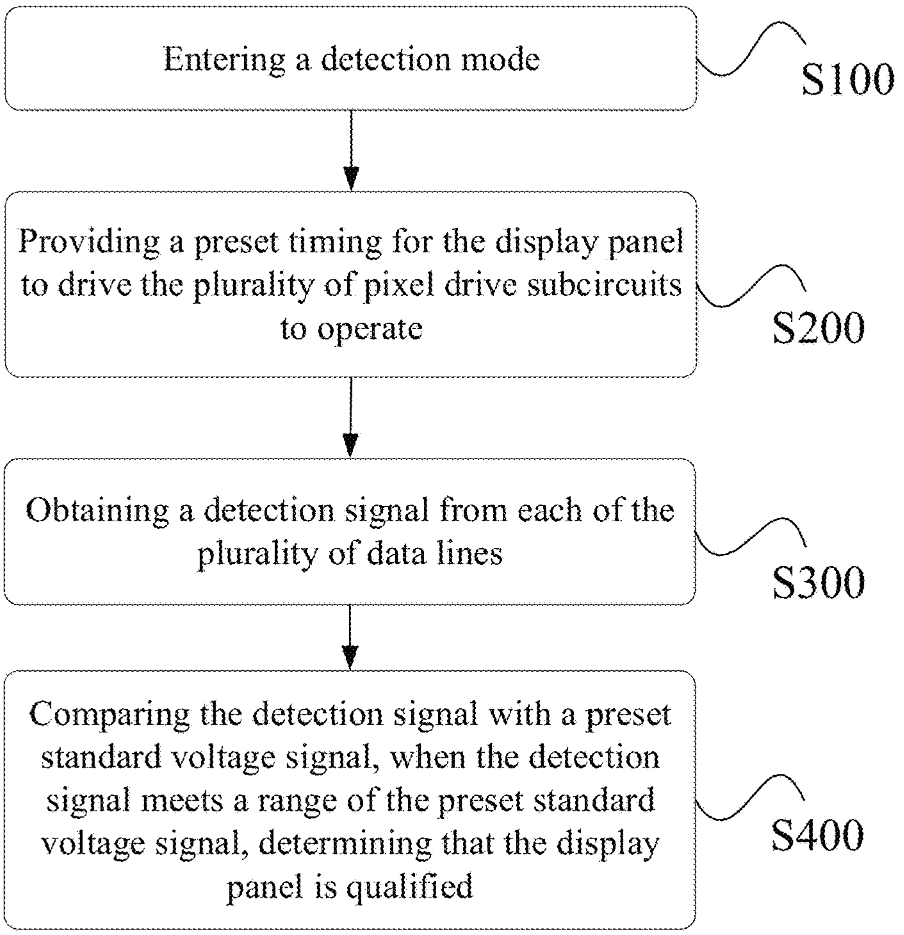
FIG. 5 is a flowchart of a detection method of a display panel according to the present application.

FIG. 5 is a flowchart of a detection method for a display panel according to the present application. As shown in FIG. 5, the present application discloses a detection method for a display panel. The display panel mentioned in the present solution is the display panel in any of the foregoing embodiments. The detection method comprises the following steps:

S100: entering a detection mode;

S200: providing a preset timing for the display panel to drive multiple pixel drive sub-circuits to operate;

S300: obtaining a detection signal from the data line;

S400: comparing the detection signal with a preset standard voltage signal; if the detection signal is within the preset standard voltage signal range, determining that the display panel is qualified.

In this application, a detector is connected between the data driver and the data output pin. When the display panel is in detection mode, a preset timing is used to drive multiple pixel drive subcircuits to operate. Then the detector receives the signal transmitted on the data line to determine the connection state between the data line and the data output pin. When the signal transmitted on the data line is inconsistent with the preset signal, it means that there is a problem with the bonding between the corresponding data line and the data output pin. In this solution, the function of the pixel drive circuit is mainly utilized. The pixel drive circuit is used to output a signal to the data line in the reverse direction to detect whether the data line is connected to the data output pin, so as to quickly detect the bonding of the display panel. When some data output pins have poor bonding, the detector is used to accurately locate the position of the data output pin to repair the display panel. On the one hand, it can improve the production yield of the display panel, which is conducive to improving the quality of the display panel. On the other hand, it can reduce the difficulty of repairing the display panel and reduce the cost.

Specifically, the step S400 further includes:

if not, locating the abnormal data line according to the detection signal, according to the detection signals of multiple rows of sub-pixels corresponding to the data line, determining whether all have abnormalities. When all have abnormalities, determining that the bonding between the data line and the data output pin is poor, if only one or more sub-pixels corresponding to the current abnormal data line have problems, determining that the wiring within the display panel is abnormal, and mura detection is required, and the mura detection information determines the defect problem.

Figure 6:
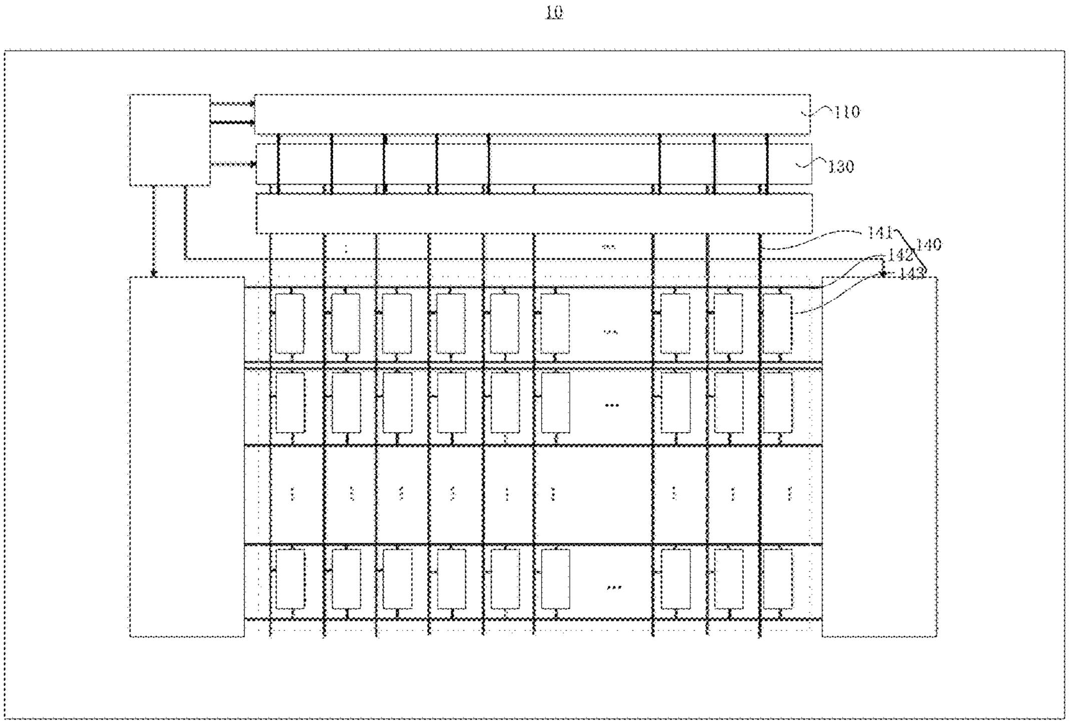
FIG. 6 is a schematic diagram of a display device according to the present application.

FIG. 6 is a schematic diagram of a display device according to the present application. As shown in FIG. 6, the present application discloses a display device 10. The display device 10 includes a display panel 100 as described in any of the above-mentioned embodiments. The display panel 100 is an organic light-emitting display panel 100.

It should be noted that the inventive concept of the present application can be formed into many embodiments, but the length of the application document is limited and so these embodiments cannot be enumerated one by one. Therefore, should no conflict be present, the various embodiments or technical features described above can be arbitrarily combined to form new embodiments. After the various embodiments or technical features are combined, the original technical effects may be enhanced.

The foregoing is a further detailed description of the present application with reference to some specific optional implementations, but it cannot be determined that the specific implementation of the present application is limited to these implementations. For those having ordinary skill in the technical field to which the present application pertains, several deductions or substitutions may be made without departing from the concept of the present application, and all these deductions or substitutions should be regarded as falling in the scope of protection of the present application.

What is claimed is:

1. A display panel, comprising:

a pixel drive circuit, comprising a plurality of control lines, a plurality of data lines, a plurality of pixel drive subcircuits, and a plurality of light-emitting elements; wherein each of the plurality of pixel drive subcircuits is used to drive a respective one of the plurality of light-emitting elements to emit light; wherein each of the plurality of pixel drive subcircuits is connected to at least one of the plurality of control lines and at least one of the plurality of data lines;

a data drive circuit, comprising a data driver and a plurality of data output pins, wherein the plurality of data output pins are connected to the plurality of data lines respectively by bonding;

a detection circuit, comprising a detector and a plurality of detection ends, wherein the plurality of detection ends are respectively connected to the plurality of data output pins, and are each used to receive a signal transmitted from the respective data line to the respective data output pin; and a power supply circuit, configured to provide a preset voltage signal for each of the plurality of pixel drive subcircuit;

wherein after entering a test mode, the display panel is configured to provide a preset timing to drive each of the plurality of control lines to be turned on, and each of the plurality of pixel drive subcircuits is caused to operate, and wherein the detection circuit is configured to obtain a detection signal from each of the plurality of data lines.

2. The display panel as recited in claim 1, wherein there is arranged a plurality of first switches between the data driver and the plurality of data output pins, and a plurality of second switches between the detector and the plurality of detection ends; wherein when the display panel is in a display mode, the plurality of first switches are turned on and the plurality of switches switch are turned off, wherein when the display panel is in a detection mode, the plurality of second switches are turned on and the plurality of first switches are turned off.

3. The display panel as recited in claim 1, wherein each of the plurality of pixel drive subcircuits comprises a drive control circuit, a storage circuit, a data input circuit, a power supply voltage input terminal, a preset voltage input terminal, and at least one control signal input terminal;

wherein one end of the storage circuit is connected to the power supply voltage input terminal, another end of the storage circuit is connected to the first node, and wherein the storage circuit is used to store a voltage of the first node;

wherein one end of the data input circuit is connected to the second node, and another end is connected to the respective data line, and wherein the data input circuit is used to receive a data signal of the respective data line and transmit the data signal to the second node;

wherein the drive control circuit is connected to the first node, the second node, the power supply voltage input terminal, the at least one control signal input terminal, the preset voltage input terminal, and the respective light-emitting element;

wherein the power supply circuit is configured to provide a power supply voltage signal for the power supply voltage input terminal, wherein the power supply voltage signal is operative to provide the preset voltage signal for the preset voltage input terminal, and wherein the respective control line is configured to provide a control signal for the at least one control signal input terminal;

wherein after entering the test mode, the respective control line is turned on according to the preset timing, and after the preset voltage signal charges the first node, the drive control circuit is operative to output a voltage of the second node from the data input circuit to the respective data line, and wherein the voltage of the second node is received by the detection circuit.

4. The display panel as recited in claim 3, wherein the drive control circuit comprises a first active switch, a second active switch, a third active switch, a fourth active switch, and a fifth active switch; wherein one end of the first active switch is connected to the power supply voltage input-put terminal, and another end of the first active switch is connected to the second node; wherein one end of the second active switch is connected to the second node, and another end of the second active switch is connected to the third node, and wherein a control end of the second active switch is connected to the first node; wherein one end of the third active switch is connected to the first node, and another end of the third active switch is connected to the third node; wherein one end of the fourth active switch is connected to the preset voltage input terminal, and another end of the fourth active switch is connected to the first node; wherein one end of the fifth active switch is connected to the third node, and another end of the fifth active switch is connected to the fourth node; wherein the fourth node is connected to the respective light-emitting element; wherein the data input circuit further comprises a sixth active switch, wherein one end of the sixth active switch is connected to the respective data line, and wherein another end of the sixth active switch is connected to the second node.

5. The display panel as recited in claim 4, wherein the preset timing comprises a test input phase and a test receiving phase, wherein in the test input phase, the first active switch, the fourth active switch, and the fifth active switch are turned on, while the third active switch and the sixth active switch are turned off, and wherein the preset voltage signal is operative to charge the first node;

wherein in the test receiving phase, the second active switch, the third active switch, and the sixth active switch are turned on, while the first active switch, the fourth active switch, and the fifth active switch are turned off, wherein the voltage of the first node is output to the respective data line through the second node and is received by the detection circuit, and wherein the detection signal is the preset voltage signal.

6. The display panel as recited in claim 4, wherein the drive control circuit further comprises a seventh active switch, wherein one end of the seventh active switch is connected to the fourth node, and wherein another end of the seventh active switch is connected to the preset voltage input terminal;

wherein the preset timing comprises a test input phase and a test receiving phase, wherein in the test input phase, the first active switch, the fourth active switch, the fifth active switch, and the seventh active switch are turned on, while the third active switch and the sixth active switch are turned off, and wherein the preset voltage signal is operative to charge the first node and the third node;

wherein in the test receiving phase, the first active switch, the second active switch, the third active switch, the fifth active switch, and the sixth active switch are turned on, while the fourth active switch and the seventh active switch are turned off, wherein the power supply voltage input terminal is operative to provide a voltage for the second node, wherein the voltage is further operative to be output to the respective data line and received by the detection circuit, and wherein the detection signal is the power supply voltage signal.

7. The display panel as recited in claim 4, wherein the at least one control signal input terminal comprises a first control signal terminal, a second control signal terminal, and a third control signal terminal; wherein a control terminal of the first active switch and a control terminal of the fifth active switch are each connected to the third control signal terminal, wherein a control terminal of the fourth active switch is connected to the first control signal terminal, wherein a control terminal of the third active switch and a control terminal of the sixth active switch are each connected to the second control signal terminal.

8. The display panel as recited in claim 3, wherein the storage circuit 151 comprises a capacitor C, wherein one end of the capacitor C is connected to the first node N1, and another end of the capacitor C is connected to the power supply voltage input terminal VDD.

9. A detection method for a display panel, wherein the display panel comprises a pixel drive circuit, a data drive circuit, a detection circuit, and a power supply circuit;

wherein the pixel drive circuit comprises a plurality of control lines, a plurality of data lines, a plurality of pixel drive subcircuits, and a plurality of light-emitting elements, wherein each of the plurality of pixel drive subcircuits is used to drive a respective one of the plurality of light-emitting elements to emit light, wherein each of the plurality of pixel drive subcircuits is connected to at least one of the plurality of control lines and at least one of the plurality of data lines;

wherein the power supply circuit is configured to provide a preset voltage signal for each of the plurality of pixel drive subcircuit; wherein the data drive circuit comprises a data driver and a plurality of data output pins, wherein the plurality of data output pins are connected to the plurality of data lines respectively by bonding;

wherein the detection circuit comprises a detector and a plurality of detection ends, wherein the plurality of detection ends are respectively connected to the plurality of data output pins, and are each used to receive a signal that is transmitted from the respective data line to the respective data output pin;

wherein after entering a test mode, the display panel is configured to provide a preset timing to drive each of the plurality of control lines to be turned on, and each of the plurality of pixel drive subcircuits is caused to operate, and wherein the detection circuit is configured to obtain a detection signal from each of the plurality of data lines;

wherein the detection method comprises:

entering the test mode;

providing the preset timing for the display panel to drive the plurality of pixel drive subcircuits to operate;

obtaining the detection signal from each of the plurality of data lines; and comparing the detection signal with a preset standard voltage signal, when the detection signal meets a range of the preset standard voltage signal, determining that the display panel is qualified.

10. The detection method as recited in claim 9, further comprising:

in response to the detection signal not meeting the range of the preset standard voltage signal when comparing the detection signal with the preset standard voltage signal, locating a respective abnormal data line according to the detection signal;

based on the detection signals of sub-pixels in a plurality of rows corresponding to the respective data line, determining whether all of the detection signals are abnormal;

in response to determining all of the detection signals are abnormal, determining that the bonding between the respective data line and the respective data output pin is poor;

in response to the respective detection signal or signals of only one or more sub-pixels corresponding to the current abnormal data line are abnormal, determining that a wiring within the display panel is abnormal.

11. The detection method for a display panel as recited in claim 9, wherein the pixel drive subcircuit comprises a drive control circuit, a storage circuit, a data input circuit, a power supply voltage input terminal, a preset voltage input terminal, and a control signal input terminal, wherein the preset timing comprises a test input phase and a test receiving phase; wherein in the test input phase, the preset voltage input terminal is operative to charge the storage circuit;

wherein in the test receiving phase, the storage circuit is operative to charge the first node, a voltage of the first node is output to the respective data line through the second node and received by the detection circuit, and wherein the detection signal is the preset voltage signal.

12. A display device, comprising a display panel, wherein the display panel comprises:

a pixel drive circuit, comprising a plurality of control lines, a plurality of data lines, a plurality of pixel drive subcircuits, and a plurality of light-emitting elements; wherein each of the plurality of pixel drive subcircuits is used to drive a respective one of the plurality of light-emitting elements to emit light; wherein each of the plurality of pixel drive subcircuits is connected to at least one of the plurality of control lines and at least one of the plurality of data lines;

a data drive circuit, comprising a data driver and a plurality of data output pins, wherein the plurality of data output pins are connected to the plurality of data lines respectively by bonding;

a detection circuit, comprising a detector and a plurality of detection ends, wherein the plurality of detection ends are respectively connected to the plurality of data output pins, and are each used to receive a signal transmitted from the respective data line to the respective data output pin; and a power supply circuit, configured to provide a preset voltage signal for each of the plurality of pixel drive subcircuit;

wherein after entering a test mode, the display panel is configured to provide a preset timing to drive each of the plurality of control lines to be turned on, and each of the plurality of pixel drive subcircuits is caused to operate, and wherein the detection circuit is configured to obtain a detection signal from each of the plurality of data lines.

13. The display device as recited in claim 12, wherein there is arranged a plurality of first switches between the data driver and the plurality of data output pins, and a plurality of second switches between the detector and the plurality of detection ends; wherein when the display panel is in a display mode, the plurality of first switches are turned on and the plurality of switches switch are turned off, wherein when the display panel is in a detection mode, the plurality of second switches are turned on and the plurality of first switches are turned off.

14. The display device as recited in claim 12, wherein each of the plurality of pixel drive subcircuits comprises a drive control circuit, a storage circuit, a data input circuit, a power supply voltage input terminal, a preset voltage input terminal, and at least one control signal input terminal, wherein one end of the storage circuit is connected to the power supply voltage input terminal, another end of the storage circuit is connected to the first node, and wherein the storage circuit is used to store a voltage of the first node;

wherein one end of the data input circuit is connected to the second node, and another end is connected to the respective data line, and wherein the data input circuit is used to receive a data signal of the respective data line and transmit the data signal to the second node;

wherein the drive control circuit is connected to the first node, the second node, the power supply voltage input terminal, the at least one control signal input terminal, the preset voltage input terminal, and the respective light-emitting element;

wherein the power supply circuit is configured to provide a power supply voltage signal for the power supply voltage input terminal, wherein the power supply voltage signal is operative to provide a preset voltage signal for the preset voltage input terminal, and wherein the respective control line is configured to provide a control signal for the at least one control signal input terminal;

wherein after entering the test mode, the respective control line is turned on according to the preset timing, and after the preset voltage signal charges the first node, the drive control circuit is operative to output a voltage of the second node from the data input circuit to the respective data line, and wherein the voltage of the second node is received by the detection circuit.

15. The display device as recited in claim 14, wherein the drive control circuit comprises a first active switch, a second active switch, a third active switch, a fourth active switch, and a fifth active switch; wherein one end of the first active switch is connected to the power supply voltage input-put terminal, and another end of the first active switch is connected to the second node; wherein one end of the second active switch is connected to the second node, and another end of the second active switch is connected to the third node, and wherein a control end of the second active switch is connected to the first node; wherein one end of the third active switch is connected to the first node, and another end of the third active switch is connected to the third node; wherein one end of the fourth active switch is connected to the preset voltage input terminal, and another end of the fourth active switch is connected to the first node; wherein one end of the fifth active switch is connected to the third node, and another end of the fifth active switch is connected to the fourth node; wherein the fourth node is connected to the respective light-emitting element; wherein the data input circuit further comprises a sixth active switch, wherein one end of the sixth active switch is connected to the respective data line, and wherein another end of the sixth active switch is connected to the second node.

16. The display device as recited in claim 15, wherein the preset timing comprises a test input phase and a test receiving phase, wherein in the test input phase, the first active switch, the fourth active switch, and the fifth active switch are turned on, while the third active switch and the sixth active switch are turned off, and wherein the preset voltage is operative to charge the first node;

wherein in the test receiving phase, the second active switch, the third active switch, and the sixth active switch are turned on, while the first active switch, the fourth active switch, and the fifth active switch are turned off, wherein the voltage of the first node is output to the respective data line through the second node and is received by the detection circuit, and wherein the detection signal is the preset voltage signal.

17. The display device as recited in claim 15, wherein the drive control circuit further comprises a seventh active switch, wherein one end of the seventh active switch is connected to the fourth node, and wherein another end of the seventh active switch is connected to the preset voltage input terminal;

wherein the preset timing comprises a test input phase and a test receiving phase, wherein in the test input phase, the first active switch, the fourth active switch, the fifth active switch, and the seventh active switch are turned on, while the third active switch and the sixth active switch are turned off, and wherein the preset voltage is operative to charge the first node and the third node;

wherein in the test receiving phase, the first active switch, the second active switch, the third active switch, the fifth active switch, and the sixth active switch are turned on, while the fourth active switch and the seventh active switch are turned off, wherein the power supply voltage input terminal is operative to provide a voltage for the second node, wherein the voltage is further operative to be output to the respective data line and received by the detection circuit, and wherein the detection signal is the power supply voltage signal.

18. The display device as recited in claim 15, wherein the at least one control signal input terminal comprises a first control signal terminal, a second control signal terminal, and a third control signal terminal; wherein a control terminal of the first active switch and a control terminal of the fifth active switch are each connected to the third control signal terminal; wherein a control terminal of the fourth active switch is connected to the first control signal terminal; wherein a control terminal of the third active switch and a control terminal of the sixth active switch are each connected to the second control signal terminal.

* * * * *